US008214342B2

(12) United States Patent
Meiresonne (10) Patent No.: US 8,214,342 B2
(45) Date of Patent: *Jul. 3, 2012

(54) SUPPLIER IDENTIFICATION AND LOCATOR SYSTEM AND METHOD

(76) Inventor: Michael Meiresonne, East Grand Rapids, MI (US)

(*) Notice: Subject to any disclaimer, the term of this patent is extended or adjusted under 35 U.S.C. 154(b) by 1561 days.

This patent is subject to a terminal disclaimer.

(21) Appl. No.: 09/938,163

(22) Filed: Aug. 23, 2001

(65) Prior Publication Data

US 2002/0087509 A1 Jul. 4, 2002

(51) Int. Cl.
*G06F 7/00* (2006.01)
*G06F 17/00* (2006.01)
*G06F 17/30* (2006.01)

(52) U.S. Cl. .............. 707/705; 707/707; 707/710

(58) Field of Classification Search .............. 707/3, 4, 707/104.1, 13, 1, 7, 10, 705–707, 709–711, 707/769; 725/44; 705/1, 27; 709/218, 238; 715/744
See application file for complete search history.

(56) References Cited

U.S. PATENT DOCUMENTS

| 5,740,425 | A | 4/1998 | Povilus |
| 6,058,376 | A | 5/2000 | Crockett |
| 6,643,641 | B1 * | 11/2003 | Snyder .............................. 707/4 |
| 6,662,192 | B1 * | 12/2003 | Rebane ....................... 707/104.1 |
| 7,559,034 | B1 | 7/2009 | Paperny et al. |
| 2002/0032677 | A1 * | 3/2002 | Morgenthaler et al. .......... 707/3 |
| 2002/0152222 | A1 * | 10/2002 | Holbrook ..................... 707/104.1 |
| 2002/0194151 | A1 * | 12/2002 | Fenton et al. ..................... 707/1 |
| 2002/0194601 | A1 * | 12/2002 | Perkes et al. ..................... 725/44 |
| 2003/0004837 | A1 * | 1/2003 | Myers et al. ..................... 705/27 |
| 2003/0023641 | A1 * | 1/2003 | Gorman et al. ............... 707/530 |
| 2004/0044600 | A1 | 3/2004 | Chu et al. |
| 2004/0073538 | A1 | 4/2004 | Leishman et al. |

OTHER PUBLICATIONS

Superpages.com, May 30, 2007, pp. 1-7.*
http://web.archive.org/web/19981212034238/http://www.yahoo.com/.*
http://web.archive.org/web/19981212021045/http://shopguide.yahoo.com/.*
http://web.archive.org/web/19981212012608/http://apparel.shopping.yahoo.com.*
http://web.archive.org/web/19981207013011/http://apparel.shopping.yahoo.com/Apparel/Men__s__and__Boys__/Pants/.*
http://web.archive.org/web/19981202083627fw__/http://www.llbean.com/bin/homepage.*
http://web.archive.org/web/19981212023239/http://www.bizrate.com/.*
http://web.archive.org/web/19980421074244/http://www.bizrate.com/display.pl?t=cat&b=cat__apparel.*

(Continued)

*Primary Examiner* — Don Wong
*Assistant Examiner* — Merilyn Nguyen
(74) *Attorney, Agent, or Firm* — Price Heneveld LLP (57) ABSTRACT

A method to identify a supplier of good or services over the Internet by providing a home page with at least one link to a directory Web site for a class of goods or services. The directory Web site includes a directory Web site domain that at least partially describes a class of goods or services. The directory Web site also contains at least one supplier link to a corresponding supplier Web site and a rollover window. The home page and the directory Web site are configured to allow a user to access the home page; select a directory Web site based at least in part on the directory Web site domain name; activate the link to the selected directory Web site; and select and activate the supplier link for a supplier of goods or services.

50 Claims, 3 Drawing Sheets

OTHER PUBLICATIONS http://web.archive.org/web/19980421075357/http://www.bizrate.com/search.pl?cat=Apparel%20:%20Accessories.* www.archive.org version of the www.contractpackage.com web site dated Sep. 14, 2000, and related linked pages.

www.archive.org version of the www.contractpackage.com web site dated Jan. 24, 2001, and related linked pages.

www.archive.org version of the www.contractpackage.com web site dated Feb. 1, 2001, and related linked pages.

www.archive.org version of the www.contractpackage.com web site dated Feb. 7, 2001, and related linked pages.

www.archive.org version of the www.contractpackage.com web site dated Mar. 2, 2001, and related linked pages.

www.archive.org version of the www.contractpackage.com web site dated Apr. 5, 2001, and related linked pages.

www.archive.org version of the www.contractpackage.com web site dated May 16, 2001, and related linked pages.

www.archive.org version of the www.contractpackage.com web site dated May 17, 2001, and related linked pages.

www.archive.org version of the www.contractpackage.com web sited dated May 18, 2001, and related linked pages.

www.archive.org version of the www.contractpackage.com web site dated May 19, 2001, and related linked pages.

www.archive.org version of the www.contractpackage.com web sited dated May 25, 2001, and related linked pages.

www.archive.org version of the www.contractpackage.com web sited dated Jul. 21, 2001, and related linked pages.

* cited by examiner

SUPPLIER IDENTIFICATION AND LOCATOR SYSTEM AND METHOD

BACKGROUND OF THE INVENTION

The present invention generally relates to the design of Web sites and interrelationships between the Web sites.

Currently, for anyone who has tried to locate specific information or a specific set of suppliers of a particular good or service over the Internet, a user has to use a typical search engine, such as Yahoo®, Excite® or Lycos®. Unfortunately, Internet search engines are unable to ask a series of pointed questions to help a user focus his or her search. Therefore, they must rely on the particular search engine's algorithm in order to rank the millions of web pages thereby determining the Web sites that best fit a given search term the user has inputted into the search engine. Thus, users typically select Web sites listed at the top of the list provided by the search engine. Consequently, Web site designers often design their Web sites with the goal of having their Web site listed at the top of search engine lists thereby increasing the number of hits to their Web site. However, a particular search engine's algorithm is typically a closely guarded trade secret. Nevertheless, most major search engines follow the same general rules.

Generally, a particular search engine's algorithm, at least preliminarily, ranks various web pages based upon the location and frequency of keywords on a web page. For example, pages containing a particular user search term, the domain name or in the header/title html tags, are typically more relevant than others to the topic being searched by the user. Consequently, web pages having a particular search term in the header tag are often assumed to be more relevant by the search algorithm. Search engines also check to see if a user's search term appears near the top of the page. The search engine's algorithm assumes that any page relevant to the topic will mention the user's search term in the headline or in the first few paragraphs of the text.

Frequency is another major factor search engines use to determine relevancy of a web page to a specific user's search term. A search engine will analyze how frequently keywords appear in relation to other words on a web page, a document on the World Wide Web. The World Wide Web is a system of Internet servers. A server is a computer or device in a network that is used to provide services to other computers or devices in the network. The web pages where the user's search term appears with a higher frequency are often deemed more relevant than other web pages.

Some search engines utilize other ingredients to further qualify the typical location and frequency algorithm method described above. One of the most often used fields that are searched is a Web site's hidden metatags. However, not all search engines read metatags. Metatags are simply a placeholder for storing information that may or may not be processed by an HTTP server or indexed by a search engine.

The final main feature most search engines use to rank and display the most relevant web pages to the user's search query includes an analysis of how pages link to each other. In this manner, a search engine can better determine what a Web site is about and whether the Web site deserves a higher ranking Links to other related Web sites outside of a given Web site typically result in a higher ranking. Some search engines also screen out attempts by computer users to build into their Web sites false links, which the Web site designer would include in an attempt to boost their rankings.

Unfortunately, a person/user attempting to locate goods or services on a particular topic using a conventional search engine may be successful in locating a few Web sites corresponding to an insignificant number of the goods and services providers corresponding to their area of interest. Searching using this technique is very laborious and time consuming, especially for a professional or business person who needs quick access to information about various suppliers of goods and services in order to compare the various suppliers and decide which supplier would best fulfill their needs. Often times, a conventional search will reveal only two or three suppliers of particular goods, but will not locate the Web sites of many other commercial suppliers of a good or service whose Web sites may not achieve, for whatever reason, as high ranking on a particular search engine.

Consequently, there is a significant need for a goods and service directory, which can easily be located using a conventional search engine accessible using a computer, which is a programmable, usually electronic, device that can store, retrieve, and process data, to access the conventional search engine on the Internet, which is an electronic communications network that connects computer networks and organizational computer facilities around the world. There is also a significant need for the directory to include numerous links to a variety of goods and services suppliers related to a particular topic while providing easy and quick navigation to and from any number of supplier Web sites so that the user can find out more detailed information than that which is provided by the directory.

SUMMARY OF THE INVENTION

The present invention includes a method for a user to identify a supplier of goods or services over the Internet by providing a home page with at least one link to a directory Web site for a class of goods or services. The directory Web site includes a directory Web site domain that at least partially describes a class of goods or services. The directory Web site also contains at least one supplier link to a corresponding supplier Web site and a rollover window where the rollover window conveys information about each supplier corresponding to the supplier link when the user's cursor is placed substantially over the supplier link. A user may thus access the home page and select a directory Web site based at least in part on the directory Web site domain name. The user activates the link to the selected directory Web site, and selects and activates the supplier link for at least one supplier of goods or services.

Another embodiment of the present invention includes a method to identify a supplier of good or services over the Internet. The method includes providing an index page displayed in an initial Internet browser window having a corresponding link to each directory Web site. The directory Web site comprises a directory Web site domain name that is at least partially descriptive of a class of goods or services. The directory Web site comprises a corresponding supplier link to each supplier Web site and a rollover window wherein the rollover window displays information about the supplier corresponding to the supplier identified by the supplier link when the user pre-selects the supplier link. The index page and the directory Web site are configured to allow a user to view the index page; select a user determined directory Web site and the corresponding link to the user determined directory Web site based at least in part on the directory Web site domain name; activate the corresponding link to the user determined directory Web site thereby causing the directory Web site to appear in the internet browser window link; select a first user determined supplier link for a first supplier of goods or services; and activate the first user determined supplier link to the corresponding user selected first supplier link, thereby launching a first supplier internet browser window and displaying the supplier Web site in the first supplier internet browser window.

Yet another embodiment of the present invention includes a supplier identification and locator system whereby a user can identify a supplier of goods or services over the Internet using an Internet browser and by also utilizing a conventional search engine employing a search algorithm. The supplier identification and locator system of the present invention includes at least one directory Web site. The directory Web site has a directory Web site domain name that is at least partially descriptive of a class of goods or services. The directory Web site includes: a corresponding supplier link to each of at least one supplier Web sites; a rollover window where the rollover window displays information about the supplier corresponding to the supplier identified by the supplier link when the user pre-selects the supplier link; a descriptive title portion substantially corresponding to the description of the class of goods or services described by the directory Web site domain name; a description of information regarding the supplier corresponding to each supplier link located substantially proximate each supplier link; and at least one substantially descriptive metatag. The Internet browser, the conventional search engine, and the directory Web site allow a user to access the conventional search engine Web site using the initial Internet browser window; input a search strategy into the conventional search engine to search for a supplier of a user determined good or service, initiating the search for a supplier of the user determined good or service; view ranked result links as analyzed by the conventional search engine's algorithm and displayed by the conventional search engine; activate a ranked result link corresponding to the directory Web site corresponding to the user inputted search strategy; pre-select the supplier link for a supplier of goods or services thereby causing the rollover window to display information corresponding to the pre-selected supplier link; and activate the supplier link for a supplier of goods or services thereby launching a subsequent internet browser window and display the supplier Web site corresponding to the activated supplier link.

Another embodiment of the present invention includes a supplier identification and locator system whereby a user can identify a supplier of goods or services over the Internet. The supplier identification and locator system includes a directory Web site with a directory Web site domain name. The directory Web site domain name is at least partially descriptive of a class of goods or services. The directory Web site has a corresponding supplier link to each of at least one supplier Web site; a supplier descriptive portion located substantially adjacent to the corresponding supplier link; a descriptive title portion substantially corresponding to the description of the class of goods or services described by the directory Web site domain name; at least one substantially descriptive metatag; and a rollover window. The rollover window displays information about the supplier corresponding to the supplier identified by the supplier link when the user pre-selects the supplier link.

These and other features, advantages and objects of the present invention will be further understood and appreciated by those skilled in the art by reference to the following specification, claims and appended drawings.

DETAILED DESCRIPTION OF PREFERRED EMBODIMENTS

Figure 1:
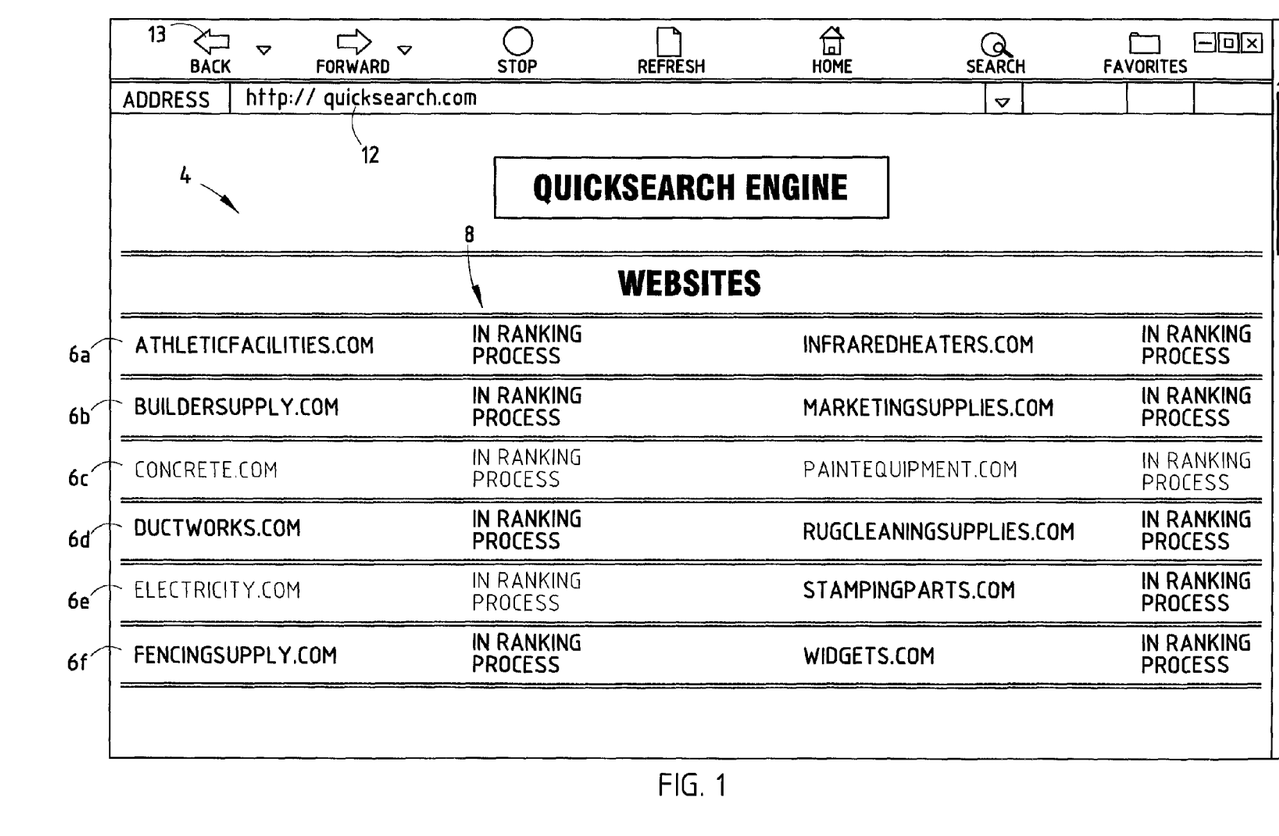
FIG. 1 is the main Internet browser window display showing a layout of a sample home page/main index of directory listings.

As shown in FIG. 1, a homepage or overall goods and services index of directories 4 generally includes a series of goods and/or services descriptive domain names 6a, 6b, 6c, 6d, etc., where each domain name is a link to a detailed directory of goods and services that are described in the domain name 6a, 6b, 6c, 6d. Also included on the index of directories is a ranking link 8a, 8b, 8c, 8d, which, when activated, links a user to a web page that provides detailed ranking and user hit information corresponding to the related goods and/or services descriptive domain names. This ranking information allows a user to determine how often other users have visited this site or otherwise used the directory. This may be important for someone searching for a goods or services provider to estimate how useful other users have found the information. The information may also be helpful to a goods or services provider who is thinking about purchasing advertising on a given directory of goods or services Web site 10 (see FIG. 2). More users utilizing the directory of goods and services Web site 10 results in more value to the subscriber because of the increased chance his/her advertisement/listing will be viewed or his/her company's Web site link 18 will be activated.

One way to identify suppliers of a class of goods or services, according to the invention, involves utilizing a computer to access Web sites of suppliers. A user may utilize a conventional search engine. In doing so, a user searching for companies offering particular goods and services would insert a search strategy or term, typically a description of the type of good or service the user is searching for, such as, in this example, widgets. In this example, a user searching for a widget would insert the descriptive term "widgets" into a conventional search engine, such as Yahoo® or Excite®, and the search results would, more than likely, reveal a directory constructed according to the present invention as one of the top ranked sites and provide a link to the directory, bypassing the home page.

Figure 2:
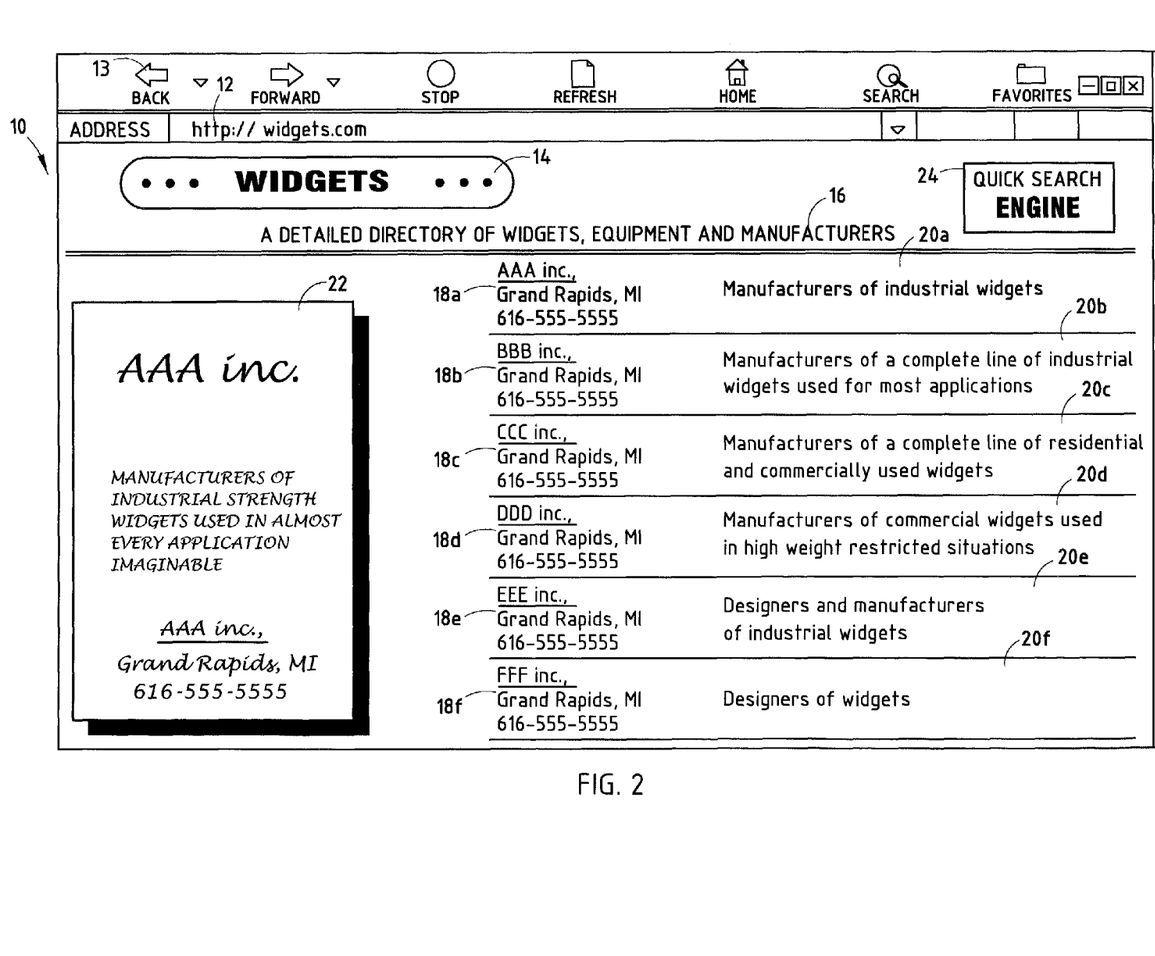
FIG. 2 is an abbreviated main directory page for widgets, a hypothetical good.

A directory, according to the present invention, achieves this high ranking by advantageously employing related elements in each of the areas where a "typical" search engine locates relevant information. For example, as shown in FIG. 2, if a user was searching for widgets, a widgets directory, constructed according to the present invention, employs a descriptive domain name, (such as http://www.widgets.com), as a portion of the Internet address. The present invention also employs the descriptive term or substantially similar descriptive term in the header 14 as well as the first paragraph of the text 16. The directory Web site also provides links to the Web sites of various suppliers who offer goods and services of the type described by the directory as well as a description of the supplier, including address and phone number and typically a written description about the supplier and/or the supplier's product(s) 20a, 20b, 20c, etc. Any type of good or service may be indexed and searched using the present invention. While the present invention is primarily to be used in connection with offering industrial goods or services, any goods or services including goods or services such as, art dealers, toys, antiques, etc., may be indexed according to the present invention as well. Any number of supplier links, including a single supplier link, may constitute a directory web site. However, preferably, multiple supplier links are included on a directory web site. The links 18*a*, 18*b*, 18*c*, 18*d*, etc., to various suppliers, are such that when a user's cursor is located over such a link, prior to activation of the link, the window 22, which can be any suitable size and may or may not have a border, displays more detailed information regarding the specific supplier of the goods or services of the directory, including the supplier's logo, without the user having to activate the link and wait for a new internet page to load into their internet browser. Information about a particular supplier may be displayed using a script language such as, Java®, JavaScript®, Flash® or other similar computer programming language of script. Streaming video or steaming audio information can also be conveyed. The rollover window is preferably located such that it is readily viewable when the user's cursor is at least substantially over any of the links 18 or the description about the supplier 20 on the directory. If numerous links 18 are listed, more than one rollover window 22 may be utilized such that a rollover window is readily viewable whenever the user's cursor is placed over any of the links.

The directory web site of the present invention may optionally be tiered. When the directory Web site is tiered, a first tier section of a supplier link is initially viewable in the Internet browser window and the rollover window area is typically larger than subsequent lower tiers further down the directory Web site. In this manner, advertising space in the first tier is at a premium because the supplier links in the first tier are initially displayed to the user when the directory Web site is accessed and the rollover window is typically larger. Any number of lower tiers of supplier links extend further down the directory Web site and may be viewed by scrolling down the directory Web site. Applicant presently prefers to use a three-tier system. Optionally, the directory Web site may also contain links to additional directory Web pages that are subsequent pages of the directory Web site. If there are too many supplier links and other information to be downloaded to the primary directory web site, the Web site will take too long to load and some users will not wait until the information is displayed. Therefore, links to subsequent directory Web pages of the directory index may be used and are useful to add still further supplier links without showing page loading time.

The surprising result achieved by the synergistic combination of having: a goods and/or services descriptive domain name; a goods and/or services descriptive term in the header; a first paragraph of text that discusses the goods and/or services of the directory; the numerous links to Web sites of suppliers who offer goods and/or services of the directory on the first page of the directory Web site; and the rollover window, is a very content—rich directory Web site that consistently gets highly ranked by conventional search engines when a user enters a search strategy substantially corresponding to the description of the goods and services index by a given directory Web site. The high ranking is due primarily to the repeated use of descriptive keywords in numerous locations and the multiple external links to the Web sites of suppliers who offer the type of goods or services indexed by the directory Web site.

Optionally, in addition to the elements described above, a directory Web site constructed according to the present invention may include any number of descriptive terms that are related to the directory Web site in the directory Web site's metatags. The metatags attempt to cover all possible related product searches and increase the ranking achieved when a user does an initial search on a search engine that utilizes an algorithm, which takes into account metatags.

As seen in FIG. 2, the directory Web site also preferably contains a link from each directory to the home page. This link allows a user who locates a directory using a conventional search engine to easily locate other directories corresponding to other goods and services by viewing the home page. The home page provides an overall index of directory Web sites. Additionally, the directory web site preferably contains links to related directory Web sites or Web sites providing general information about the goods and/or services that are the subject of the directory Web sites or trade associations.

Figure 3:
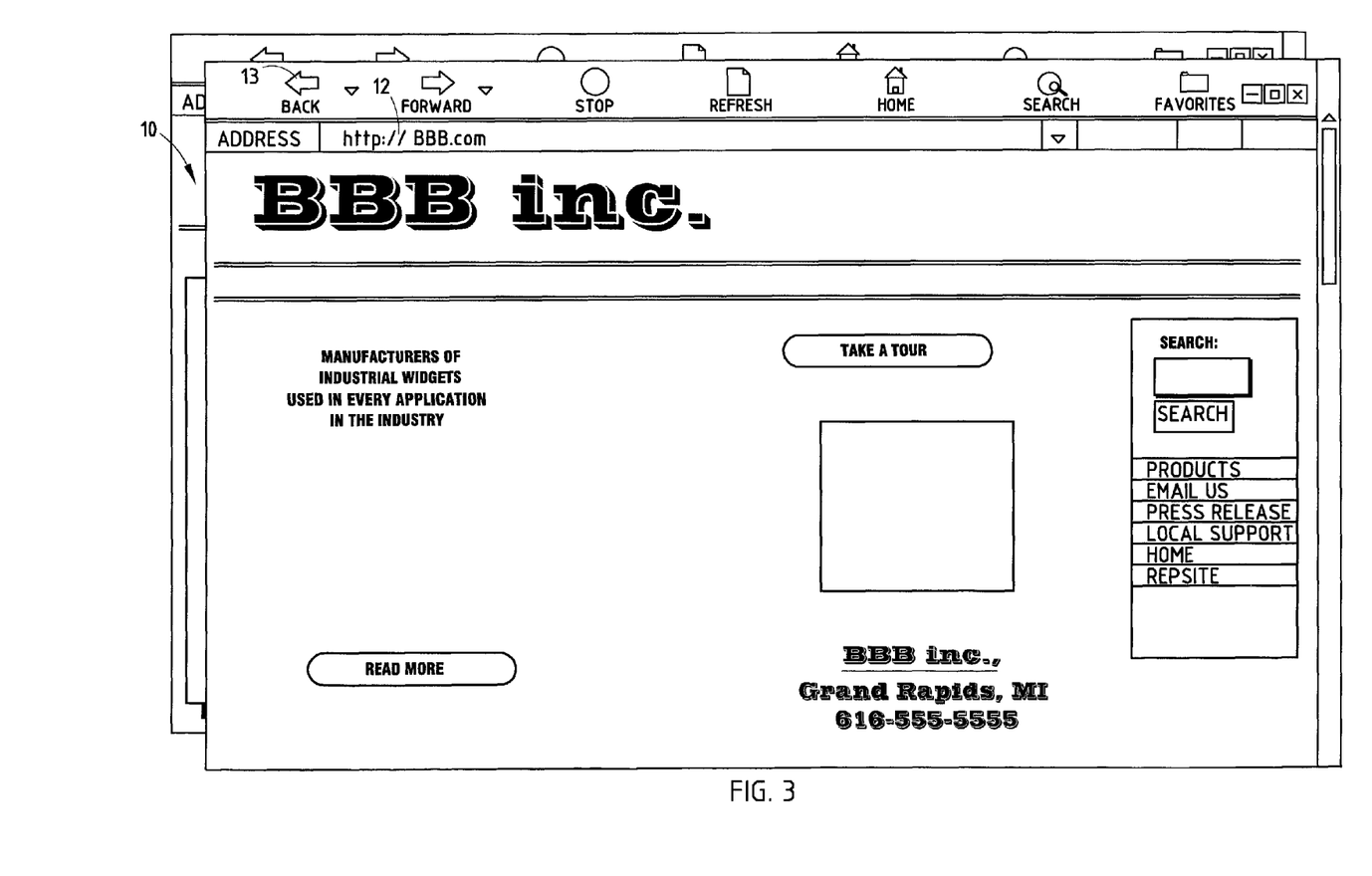
FIG. 3 shows a subsequent window displaying a supplier's Web site while the separate directory Internet browser window remains open.

Once a specific goods or services directory desired by the user is located using a conventional search engine or accessed directly if the site directory is already known to the user, the particular layout of the general aspects of the present invention allow a user to quickly and readily search through the information contained on the directory Web site. As seen in FIG. 3, in addition to providing the rollover popup window, which provides added supplier information when the user pre-selects the link by placing his/her cursor over a given link, if the user activates the link to a specific goods or services provider listed in the directory, a separate internet browser window appears 30. This separate window allows the user to navigate through this potential supplier's Web site while easily returning to the directory page by simply closing the new window 30 or selecting the still active separate Internet browser window, which continues to display the directory Web site. This setup eliminates the need to press the "back" link on a browser to return to the directory Web site. Moreover, any number of such extra windows 30 may be open at any one time such that the user may view the Web sites of many suppliers of a good or service at any given time. This allows a user to quickly and easily narrow down the particular supplier he/she wishes to choose to contact regarding providing him/her with the goods or services he/she requires. Moreover, since the supplier's Web site appears within a new Internet browser window, closing the new Internet browser window that displays the supplier's site automatically returns the user to the Internet browser window that displays the directory Web site. This feature is unlike conventional search engines where, if the user closes the browser containing the supplier's Web site where the supplier's Web site is being displayed, one must reopen and return to the search engine.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A method to identify a supplier of goods or services over the Internet comprising:

accessing a home page stored on a server and accessible to a user via the Internet wherein the home page comprises at least one link to a directory Web site for a class of goods or services having a directory Web site address wherein a portion of the directory Web site address textually describes the class of goods or services for the directory Web site;

selecting a class of goods or services having a link to a selected directory Web site corresponding to the selected class of goods or services;

activating the link to a selected directory Web site corresponding to the selected class of goods or services, wherein a portion of the directory Web site address of the selected directory Web site defines the selected class of goods or services; and receiving a display of the selected directory Web site, wherein the selected directory Web site contains a plurality of supplier links individually corresponding to and linking to a supplier's Web site wherein the corresponding supplier offers the goods or services of the selected class of goods or services and a rollover window that individually displays information corresponding to more than one of the suppliers corresponding to the plurality of supplier links in the same rollover window and wherein the rollover window does not obscure other content on the directory Web site; the rollover window is positioned proximate at least one of the plurality of supplier links; the rollover window displays information about a first pre-selected supplier when a user pre-selects a first supplier link; and the same rollover window displays information about a second pre-selected supplier when a user pre-selects a second supplier link.

2. The method of claim 1, wherein the selected directory Web site further comprises a first paragraph of text comprising a textual description of the selected class of goods or services and the directory Web site address includes a domain name portion wherein the domain name portion of the selected directory Web site textually defines the selected class of goods or services.

3. The method of claim 2, wherein the selected directory Web site further comprises a descriptive title portion at least partially corresponding to the description of the selected class of goods or services described by the selected directory Web site address.

4. The method of claim 1 wherein the rollover window does not obscure other content on the directory Web site and further comprising the step of pre-selecting a supplier link thereby causing the rollover window to display information corresponding to the pre-selected supplier link.

5. The method of claim 3, wherein the selected directory Web site further comprises a supplier descriptive portion corresponding to the supplier located adjacent the corresponding supplier link; wherein the selected directory Web site further comprises a link to the home page, and wherein the supplier descriptive portion describes the supplier who offers goods or services of the selected class of goods or services.

6. The method of claim 4, wherein the step of pre-selecting a supplier link by the user further comprises placing a user's cursor over or proximate to the pre-selected supplier link on the directory Web site thereby causing the rollover window to display information corresponding to a user selected supplier link.

7. The method of claim 6, wherein the selected directory Web site comprises at least one at least partially descriptive metatag.

8. The method of claim 1, further comprising the steps of activating the supplier link for a supplier of a class of goods or services thereby launching a separate internet browser window; and displaying the supplier Web site corresponding to the activated supplier link in the separate internet browser window.

9. The method of claim 1, wherein the rollover window does not obscure other content on the directory Web site conveys information and the information is chosen from the group consisting of information audibly conveyed to the user and information visually conveyed to the user.

10. A method to identify suppliers of goods or services over the Internet comprising the following steps:

a user accessing an index page by utilizing a computer connected to the Internet to display an index page to the user in an initial Internet browser window;

wherein the index page is stored on a storage medium accessible from the Internet and comprises:

a link corresponding to a directory Web site, wherein the directory Web site comprises:

a directory Web site address wherein a portion of the directory Web site address textually describes a class of goods or services;

a plurality of individual supplier links to a plurality of individual supplier Web sites for a plurality of individual suppliers who offer the goods or services of the class of goods or services of the directory Web site; and a rollover window that individually displays information corresponding to more than one of the individual supplier links in the same rollover window and wherein the rollover window does not obscure other content on the directory Web site; the rollover window is positioned proximate at least one of the plurality of supplier links; the rollover window displays information about a first pre-selected supplier when a user pre-selects a first supplier link; and the same rollover window displays information about a second pre-selected supplier when a user pre-selects a second supplier link;

the user selecting from the index page, a user determined directory Web site and the corresponding link to the directory Web site based upon the class of goods or services;

the user activating the link corresponding to the user determined directory Web site thereby causing the directory Web site to be displayed to the user in a directory Web site Internet browser window;

the user pre-selecting a supplier link to a supplier Web site for a supplier who offers the goods or services of the class of goods or services of the directory Web site and thereby displaying information in the rollover window about the pre-selected supplier; and the user activating the supplier link thereby launching a supplier internet browser window and displaying the supplier's Web site or supplier information in the supplier internet browser window and wherein the directory Web site remains displayed in a separate window and wherein the supplier offers goods or services of the class of goods or services.

11. The method of claim 10, wherein the index page comprises a plurality of links to corresponding directory Web sites and wherein each directory Web site comprises a plurality of supplier links and further comprising the steps of:

selecting a subsequent user determined supplier link for a subsequent supplier of goods or services; and activating the subsequent user determined supplier link to the corresponding user selected subsequent supplier Web site thereby launching a second supplier internet browser window and displaying the subsequent supplier Web site in the second supplier internet browser window.

12. The method of claim 11, wherein the directory Web site further comprises a descriptive title portion and a first paragraph of text comprising a textual description of the described class of goods or services between the descriptive title portion and the supplier link and wherein the descriptive title portion is located in the header of the directory Web site and at least partially corresponds to the textual description of the class of goods or services.

13. The method of claim 12, wherein the directory Web site further comprises a link to the index page.

14. The method of claim 13, wherein the directory Web site further comprises a description of information regarding a supplier corresponding to the supplier.

15. The method of claim 14, wherein the description of information regarding a supplier corresponding to the supplier is located adjacent the corresponding supplier link.

16. The method of claim 15, wherein the directory Web site comprises at least one at least partially descriptive metatag.

17. A supplier identification and locator system including a server whereby a user can identify a supplier of goods or services over the Internet using an Internet browser by at least partially utilizing a conventional search engine employing a search algorithm, the supplier identification and locator system comprising:
   at least one directory Web site stored on the server accessible from the Internet, wherein the directory Web site comprises:
      a directory Web site address, wherein a portion of the directory Web site address textually describes a class of goods or services, and a plurality of vertically listed and displayed supplier links to corresponding suppliers' Web sites, wherein each supplier link accesses the corresponding supplier's Web site when activated and wherein the supplier offers the goods or services of the described class of goods or services;
      a rollover window wherein the rollover window displays information about each supplier corresponding to the supplier identified by the supplier link in the same rollover window when the user pre-selects one of the plurality of supplier links or a description of information regarding each supplier corresponding to each supplier link wherein each description of information is located proximate each supplier link corresponding to each description of information, wherein the information displayed in the rollover window includes a description of at least one of the supplier's goods or services of the described class of goods or services offered by the supplier corresponding to the preselected supplier links or the preselected information; and
      a descriptive title portion at least partially corresponding to the description of the described class of goods or services described by the directory Web site address; and
      wherein the Internet browser, the conventional search engine, and the directory Web site are configured to allow a user to: access the conventional search engine Web site using an initial Internet browser window; input a search strategy into the conventional search engine to search for a supplier of a user determined good or service; initiate the search for a supplier of the user determined good or service; view ranked result links as analyzed by the conventional search engine's algorithm and displayed by the conventional search engine; activate a ranked result link corresponding to the directory Web site corresponding to the user inputted search strategy; pre-select the supplier link for a supplier of goods or services thereby causing the rollover window to display information corresponding to the pre-selected supplier link; and activate the supplier link for a supplier who offers the goods or services of the class of goods or services at least partially described by the directory Web site address thereby launching a subsequent Internet browser window and displaying the supplier Web site corresponding to the activated supplier link.

18. The supplier identification and locator system of claim 17, wherein the supplier link comprises a domain name link; the directory Web site address includes a domain name portion; the descriptive title portion is positioned at the top of the directory Web site; and wherein the directory Web site domain name portion textually defines the class of goods or services.

19. A supplier identification and locator system including a server whereby a user can identify a supplier of goods or services over the Internet comprising:
   at least one directory Web site stored on the server accessible from the Internet, wherein each directory Web site comprises:
      a directory Web site address wherein a portion of the directory Web site address textually describes a class of goods or services;
      a plurality of individual supplier links to each of a plurality of supplier Web sites, wherein the plurality of supplier links individually access correspond to an individual supplier's Web site and the supplier offers the goods or services of the textually described class of goods or services;
      a supplier descriptive portion located adjacent to the corresponding supplier link, wherein the supplier descriptive portion is at least partially textually descriptive of the described class of goods or services;
      a descriptive title portion proximate the top of the directory web site at least partially textually corresponding to and textually describing the described class of goods or services textually described by the directory Web site address; and
      a rollover window, wherein the rollover window individually displays information corresponding to more than one of the plurality of suppliers identified by the plurality of supplier links in the same rollover window and wherein the rollover window does not obscure other content on the directory Web site; the rollover window is positioned proximate at least one of the plurality of supplier links; the rollover window displays information about a first pre-selected supplier when a user pre-selects a first supplier link by placing the user's cursor at least substantially over a first supplier link, at least substantially over a first supplier descriptive portion or substantially adjacent a first supplier descriptive portion; and the same rollover window displays information about a second pre-selected supplier when a user pre-selects a second supplier link by placing the user's cursor at least substantially over a second supplier link, at least substantially over a second supplier descriptive portion or substantially adjacent a second supplier descriptive portion.

20. The supplier identification and locator system of claim 19, wherein the rollover window utilizes a script to display the information about the supplier and wherein the information displayed in the rollover window includes a description of at least one of the supplier's goods or services of the described class of goods or services.

21. A supplier identification and locator system including a server whereby a user can identify a supplier of goods or services over the Internet comprising:
   at least one directory Web site stored on the server accessible from the Internet, wherein the directory Web site comprises a directory Web site address, wherein a portion of the directory Web site address textually describes a class of goods or services; a plurality of supplier links where activation of a supplier link accesses that supplier's Web site, wherein the supplier offers goods or services of the textually described class of goods or services; a supplier descriptive portion located adjacent to the corresponding supplier link; a textually descriptive title portion positioned and displayed at the top of the directory Web site and at least partially corresponding to the textually described class of goods or services; and a first rollover window that individually displays information in the same rollover window about a plurality of the suppliers corresponding to a plurality of suppliers identified by a plurality of the supplier links in the same rollover window, and wherein the information displayed by the first rollover window includes a written description of a plurality of the suppliers' goods or services that relate to the textually described class of goods or services and wherein the rollover window does not obscure other content on the directory Web site; the rollover window is positioned proximate at least one of the plurality of supplier links; the rollover window displays information about a first pre-selected supplier when a user pre-selects a first supplier link; and the same rollover window displays information about a second pre-selected supplier when a user pre-selects a second supplier link.

22. The supplier identification and locator system of claim 21, wherein the directory Web site further comprises a first set of supplier links comprising a plurality of supplier links and a second set of supplier links comprising a plurality of supplier links.

23. The supplier identification and locator system of claim 21, wherein the directory Web site further comprises a second set of supplier links comprising a plurality of supplier links.

24. The supplier identification and locator system of claim 22, wherein at least a portion of the first rollover window is visible to the user when at least a portion of the plurality of the supplier links of the first set of supplier links are visible to the user.

25. The supplier identification and locator system of claim 23, wherein at least a portion of the first rollover window is visible to the user when at least a portion of the plurality of the supplier links of the first set of supplier links are visible.

26. The supplier identification and locator system of claim 21, wherein the directory Web site further comprises a second rollover window.

27. The supplier identification and locator system of claim 21, wherein the system comprises a plurality of directory Web sites.

28. The supplier identification and locator system of claim 27, wherein each of the plurality of directory Web sites contain at least one link to at least one other directory Web site of the supplier identification and locator system.

29. The supplier identification and locator system of claim 22, wherein the directory Web site further comprises a second rollover window that is visible when the user views at least a portion of the second set of supplier links and wherein the second rollover window displays information regarding the suppliers corresponding to the supplier links contained in the second set of supplier links in the same rollover window.

30. The supplier identification and locator system of claim 23, wherein the directory Web site further comprises a second rollover window that is visible when the user views at least a portion of the second set of supplier links and wherein the second rollover window displays information regarding the suppliers corresponding to the supplier links contained in the second set of supplier links in the same rollover window.

31. The supplier identification and locator system of claim 21, wherein the directory Web site further comprises at least one metatag at least partially descriptive of the described class of goods or services.

32. A supplier identification and locator system including a server whereby a user can identify a supplier of goods or services over the Internet comprising:
at least one directory Web site stored on the server accessible from the Internet, wherein the directory Web site comprises a directory Web site address wherein a portion of the directory Web site address textually describes a class of goods or services; a plurality of supplier links for a plurality of individual suppliers where activation of a supplier link accesses a Web site having information regarding a supplier corresponding to that supplier link who offers the goods or services of the described class of goods or services; a plurality of supplier descriptive portions located adjacent to and corresponding to a plurality of individual supplier links; a textually descriptive title portion at least partially textually describing the textually described class of goods or services; and a first rollover window that displays information about more than one of the individual suppliers in the same rollover window and wherein information displayed to the user is displayed for one of the individual suppliers at a time and wherein the rollover window does not obscure other content on the directory Web site; the rollover window is positioned proximate at least one of the plurality of supplier links; the rollover window displays information about a first pre-selected supplier when a user pre-selects a first supplier link; and the same rollover window displays information about a second pre-selected supplier when a user pre-selects a second supplier link.

33. The supplier identification and locator system of claim 32, wherein the first rollover window displays information about a plurality of suppliers corresponding to one of the plurality of suppliers identified by one of the plurality of supplier links when the user pre-selects one of the supplier links.

34. The supplier identification and locator system of claim 32, wherein the directory Web site comprises a first set of supplier links and a second set of supplier links.

35. The supplier identification and locator system of claim 33, wherein the directory Web site comprises a first set of supplier links and a second set of supplier links.

36. The supplier identification and locator system of claim 34, wherein at least a portion of the first rollover window is visible to the user when of the first set of supplier links is visible to the user.

37. The supplier identification and locator system of claim 35, wherein at least a portion of the first rollover window is visible to the user when at least a portion of the plurality of the supplier links of the first set of supplier links are visible to the user.

38. The supplier identification and locator system of claim 32, wherein the directory Web site comprises a second rollover window.

39. The supplier identification and locator system of claim 32, wherein the system comprises a plurality of directory Web sites.

40. The supplier identification and locator system of claim 39, wherein each of the plurality of directory Web sites contain at least one link to at least one other directory Web site of the supplier identification and locator system.

41. The supplier identification and locator system of claim 34, wherein the directory Web site further comprises a second rollover window that is visible to the user when the user views at least a portion of the second set of supplier links and the second rollover window individually displays information to the user about more than one of the suppliers of the second set of supplier links in the same rollover window.

42. The supplier identification and locator system of claim 35, wherein the directory Web site further comprises a second rollover window that is visible to the user when the user views at least a portion of the second set of supplier links and the second rollover window individually displays information to the user about more than one of the suppliers of the second set of supplier links in the same rollover window.

43. The supplier identification and locator system of claim 32, wherein the directory Web site further comprises at least one metatag at least partially descriptive of the described class of goods or services.

44. The supplier identification and locator system of claim 43, wherein the directory Web site further comprises a second rollover window that displays information to the user about a supplier of the plurality of suppliers corresponding to the plurality of suppliers identified by the plurality of supplier links when the user pre-selects one of the plurality of supplier links.

45. A supplier identification and locator system including a server whereby a user can identify a supplier of goods or services comprising:
   a plurality of directory Web sites stored on the server accessible from the Internet wherein the directory web sites comprise:
      a directory Web site address wherein a portion of the directory Web site address textually describes a class of goods or services;
      a plurality of supplier links to individual supplier Web sites where activation of a supplier link accesses one of the individual supplier Web sites having information regarding the supplier corresponding to the supplier link who offers the goods or services of the textually described class of goods or services;
      a plurality of supplier descriptive portions wherein an individual supplier descriptive portion of the plurality of supplier descriptive portions is positioned adjacent to one of the links that access a Web site having information regarding the individual supplier described by the individual supplier descriptive portion;
      a descriptive title portion textually describing the textually described class of goods or services described by the directory web site address;
      a rollover window that individually displays information about more than one of the individual suppliers in the same rollover window corresponding to the plurality of supplier links and wherein the rollover window does not obscure other content on the directory Web site; the rollover window is positioned proximate at least one of the plurality of supplier links; the rollover window displays information about a first pre-selected supplier when a user pre-selects a first supplier link; and the same rollover window displays information about a second pre-selected supplier when a user pre-selects a second supplier link.

46. The supplier identification and locator system of claim 45, wherein the directory Web site further comprises a related directory Web site link and wherein the directory Web sites are configured to allow a user to: access a conventional search engine; input a search strategy into the conventional search engine to search for a supplier of a user determined good or service; view ranked result links as analyzed by the conventional search engine's algorithm and displayed by the conventional search engine; and activate a ranked result link corresponding to the directory web site corresponding to the user inputted search strategy thereby allowing the user to access the directory Web site corresponding to the user inputted search strategy.

47. A method to identify a supplier of goods or services comprising:
   providing a plurality of directory Web sites wherein the directory Web sites comprise:
      a directory Web site address wherein a portion of the directory Web site address textually describes a class of goods or services;
      a plurality of supplier links where activation of an individual supplier link of the plurality of supplier links accesses a Web site having information regarding an individual supplier who offers the goods or services of the described class of goods or services;
      a supplier descriptive portion adjacent to more than one of the plurality of supplier links wherein the supplier descriptive portions describe the corresponding individual supplier who offers goods or services of the described class of goods or services;
      a textually descriptive title portion at least partially corresponding to the textually described class of goods or services; and
      a rollover window that individually displays information about a plurality of the individual suppliers in the same rollover window and corresponding to more than one of the suppliers corresponding to the plurality of supplier links in the same rollover window wherein the rollover window does not obscure other content on the directory Web site; the rollover window is positioned proximate at least one of the plurality of supplier links; the rollover window displays information about a first pre-selected supplier when a user pre-selects a first supplier link by placing the user's cursor at least substantially over a first supplier link, at least substantially over a first supplier descriptive portion or substantially adjacent a first supplier descriptive portion; and the same rollover window displays information about a second pre-selected supplier when a user pre-selects a second supplier link by placing the user's cursor at least substantially over a second supplier link, at least substantially over a second supplier descriptive portion or substantially adjacent a second supplier descriptive portion;
   accessing a conventional search engine;
   inputting a search strategy into the conventional search engine to search for a supplier of a user determined class of goods or services;
   viewing ranked result links as analyzed by the conventional search engine's algorithm and displayed by the conventional search engine; and
   activating a ranked result link corresponding to one of the plurality of directory web sites having a directory Web site address wherein a portion of the Web site address textually describes the goods or services corresponding to the user inputted search strategy whereby the user accesses the directory web site corresponding to the user determined class of goods or services and receives a display of the directory Web site accessed by the user, wherein the directory Web site corresponding to the user determined class of goods or services contains at least one supplier link to a corresponding supplier's Web site, wherein selection and activation of the supplier link by a user accesses and displays the individual supplier's Web site wherein the individual supplier offers the goods or services of the user determined class of goods or services.

48. The method of claim 47 further comprising the step of placing the cursor over or proximate to an individual supplier link on the directory Web site thereby causing the rollover window to display information corresponding to the individual supplier link having the cursor over or proximate it.

49. A method to identify a supplier of goods or services comprising:
  providing a plurality of directory Web sites stored on a server accessible from the Internet, wherein the directory web sites comprise:
    a directory web site address that is at least partially textually descriptive of a class of goods or services;
    a plurality of individual, vertically listed supplier links where activation of a supplier link accesses a Web site having information regarding an individual supplier who offers the goods or services of the class of goods or services at least partially described by the directory Web site address;
    a plurality of individual supplier descriptive portions wherein an individual supplier descriptive portion is adjacent to a corresponding individual supplier link that accesses the Web site having information regarding the individual supplier who offers goods or services of the class of goods or services at least partially textually described by the directory Web site address;
    a textually descriptive title portion positioned at the top of the directory Web site and at least partially corresponding to the textual description of the class of goods or services described by the directory web site address; and
    a rollover window that individually displays information in the same rollover window about a plurality of the individual suppliers corresponding to the individual supplier identified by at least one of the links and wherein the rollover window does not obscure other content on the directory Web site; the rollover window is positioned proximate at least one of the plurality of supplier links; the rollover window displays information about a first pre-selected supplier when a user pre-selects a first supplier link; and the same rollover window displays information about a second pre-selected supplier when a user pre-selects a second supplier link;
  accessing a conventional search engine web site;
  inputting a search strategy into the conventional search engine to search for a supplier of a user determined good or service;
    viewing ranked result links as analyzed by the conventional search engine's algorithm and displayed by the conventional search engine; and
    activating a result link corresponding to the directory web site having a directory Web site address that textually at least partially describes the user determined good or service thereby allowing the user to access the directory web site corresponding to the user inputted search strategy for the user determined good or service.

50. The method of claim 49, wherein the directory Web sites further comprise a related directory Web site link to another one of the plurality of directory Web sites stored on the server accessible from the Internet.

* * * * *